United States Patent Office 3,374,641
Patented Mar. 26, 1968

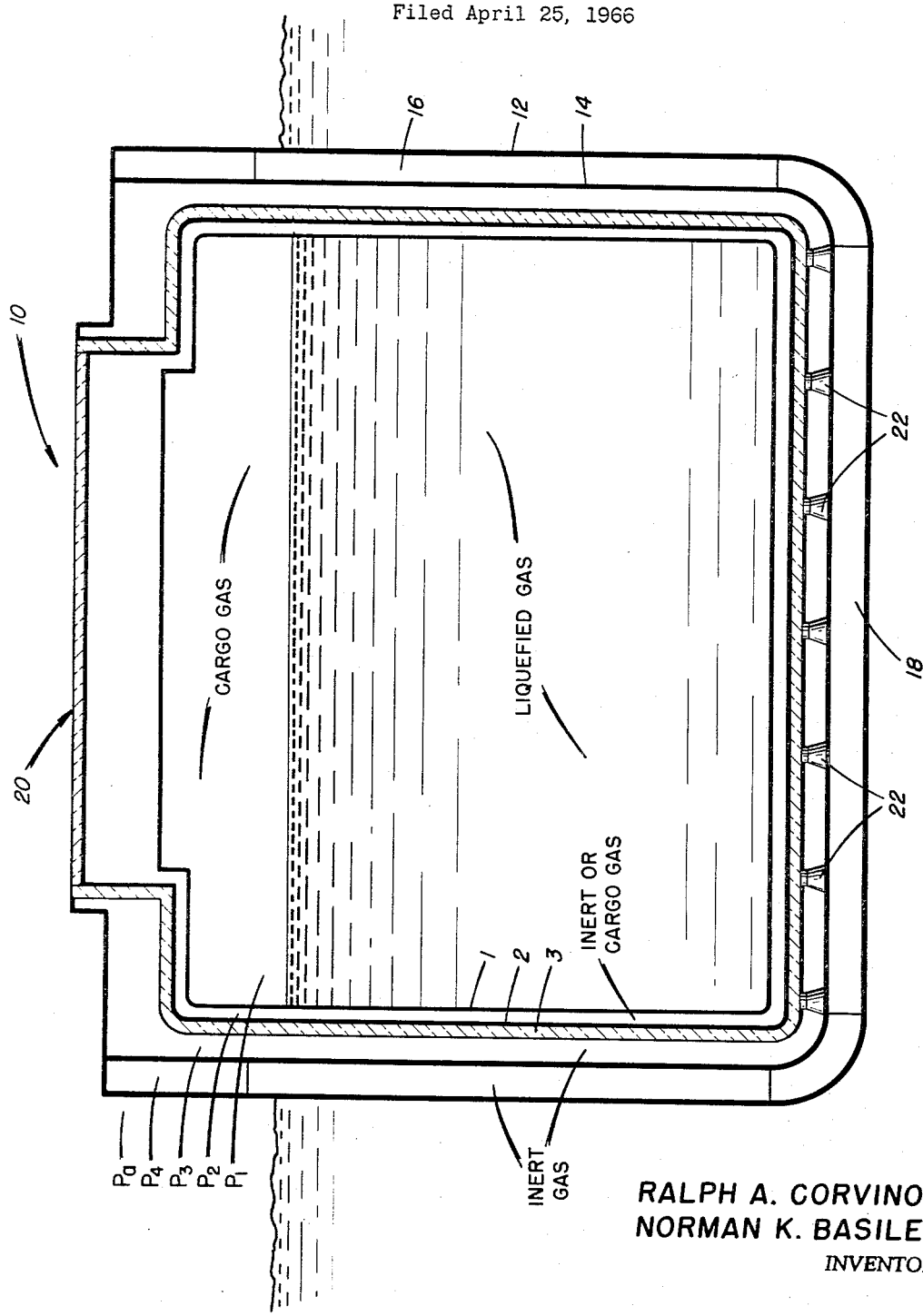

3,374,641
ARRANGEMENT FOR PROTECTING LIQUEFIED GAS TRANSPORTING VEHICLES
Ralph A. Corvino, Spring Valley, and Norman K. Basile, Bronx, N.Y., assignors to John J. McMullen, Montclair, N.J.
Filed Apr. 25, 1966, Ser. No. 544,979
3 Claims. (Cl. 62—55)

ABSTRACT OF THE DISCLOSURE

A liquefied gas tanker including free standing double wall tanks. For the first time, the invention provides inert gas within the wing tanks so that they can be pressurized to greater than ambient pressure insuring in the case of collision that gas will migrate outward away from the vessel instead of permitting a rush of air inward to within the ship. Further protection is provided by a pressure gradient increasing from the wing tanks toward the cargo gas within the inner tank also to insure that the passage of gas is from inward toward the ambient in the case of leaks or collision.

---

The present invention relates to an arrangement for reducing the chance of a major explosion or fire occurring in vehicles, particularly ships, fitted with or transporting liquefied gas storage tanks.

Because of the volatile and explosive nature of liquid and gas of this type when mixed in the proper ratio with air, it is extremely important to design and build the safest transporting arrangement which excludes an oxygen bearing atmosphere surrounding the liquefied gas storage tanks. Thus, a potentially dangerous condition would exist in the event oxygen-containing gases are allowed to enter the spaces around the tank or within the tank itself. In the past, the spaces around the tank have been inerted, however, the spaces within the supporting structure housed an oxygen-containing atmosphere.

It is the primary object of the present invention to provide an arrangement for liquefied gas storage tanks, particularly for those on ships, wherein the types of gases and respective pressures in various spaces inside and outside the tank afford a safer condition for the tank and reduce the chance of fires and/or explosion.

One example of the present invention has the void space and ballast tanks defined by the ship filled with inert gas and a pressure gradient being provided, with the pressure within the tank being the highest and the pressure in the outermost compartments of the ship being the lowest, so that in the event leaks or cracks occur in the various walls the gas flow is outward and away from stored cargo. In addition, the pressure in the outermost ship's compartments is greater than the ambient so that, in the event the outer ships skin is pierced, gas flow is outward. In this way, the chances of ambient gas reaching the cargo gas resulting in a potential explosive mixture within the transporting vehicle, are reduced.

Other and further objects of the present invention will become apparent with the following detailed description when taken in view of the appended drawings, in which the figure diagramatically illustrates a transverse vertical section taken through a gas tanker, according to the present invention.

With reference to the figure, ship 10 has a hull comprised of the outer skin or shell 12, and an inner hull 14 spaced therefrom to define wing tanks 16 and a double bottom 18. A free standing double wall cargo tank, 20, is supported on the double bottom by a plurality of pillars, 22. Tank 20 comprises an inner tank 1, a spaced outer tank 2, preferably with insulation 3 hung about the outer tank 2.

A body of liquefied gas, such as methane, ammonia, ethylene, or the like, partially fills the inner tank 1, and a gaseous atmosphere with pressure $P_1$ fills the remainder thereof. The space between the inner and outer tank also contains a gaseous atmosphere at pressure $P_2$, which could be an inert gas, but is preferably a cargo gas. The void space between the ship's supporting structure 14 and tank 2 is filled with an inert gas, such as purified and dehumidified flue gas from any convenient source, and to a pressure $P_3$. The free spaces in the wing tanks 16 are also filled with an inert gas at pressure $P_4$.

Also, according to the invention, the arrangement includes the feature of a gas pressure gradient between the cargo tank and the atmosphere such that, during operation, $P_1$ is greater than $P_2$ is greater than $P_3$ is greater than or equal to $P_4$ is greater than or equal to the ambient pressure $P_a$. Thereby, in the event of an opening in any barrier or the ship's hull gases will tend to flow from inside out to atmosphere. For example:

|  | P.s.i.g. |
|---|---|
| $P_1$ | 1.5 |
| $P_2$ | 1.0 |
| $P_3$ | 0.5 |
| $P_4$ | (min.) 0–(max.) 0.5 |
| $P_a$ | 0 |

In the event of a collision, piercing the ship's shell 12 only, the possibility of fire or explosion is extremely remote. A collision involving penetration of ship's shell 12 and inner hull 14 will result in egress of inert gas to the atmosphere, thus preventing fire or explosion. A collision involving penetration of the ship's shell, inner hull and secondary barrier 2 will involve an egress of inert gas and/or a mixture of inert gas and cargo gas through the opening formed by the colliding vessel, and an explosive or burnable mixture will only be formed in the outside of the vessel. Under these conditions, the possibility of a major explosion is minimized and any delayed ignition, if such ignition occurs, will be located at a point remote from the cargo tank, thus reducing the possibility of a major fire or explosion.

Thus, there has been described a new and improved arrangement for protecting vehicles with tanks containing volatile fluids from fire and/or explosion. It should be understood that various modifications can made to the herein disclosed example of the present invention without departing from the spirit and scope thereof.

What is claimed is:

1. An arrangement for reducing the chance of a major fire or explosion occurring within a vehicle, particularly a ship, fitted with or transporting liquefied gas storage tanks containing liquefied gas of one type and cargo gas of the same type at a pressure of about 1.5 p.s.i.g., the ship's supporting structure at least partially surrounding the tank in spaced relation to define a void space about the tank and a wing tank outboard of the void space, said arrangement comprising inert gas filling the free space in the wing tank at a pressure of about 0.5 p.s.i.g. and the void space at a pressure equal to or greater than the wing tank gas pressure, each said tank comprising an inner tank containing the liquid cargo and the cargo gas and a spaced outer tank containing a gas at a pressure below the cargo gas pressure and above the wing tank gas pressure.

2. A method for reducing the chance of a major fire or explosion occurring within a vessel transporting liquefied gas within liquefied gas storage tanks partially filled with the liquefied gas cargo and containing an atmosphere of cargo gas, the ship's supporting structure at least partially surrounding the tank in spaced relation to define a void space about the tank and a wing tank outboard of the void space, said method comprising maintaining said cargo gas within the tank above ambient pressure, filling the void space and wing tanks respectively with atmospheres of inert gas and pressurizing said atmospheres such that the void space pressure is less than the cargo gas pressure but greater than the wing tank pressure and the wing tank pressure is greater than ambient pressure so as to assure that gas flow moves in an outward direction in the event leaks or cracks develop in any barrier or supporting structure membrane.

3. The method of claim 2 wherein said tank comprises a free standing double walled tank in which the inner wall is everywhere spaced from the outer wall and liquefied cargo is only carried within the inner wall, said method further including delivering a gaseous atmosphere within said outer tank and pressurizing this atmosphere to a pressure less than said cargo gas and greater than the pressure in said void space.

References Cited

UNITED STATES PATENTS

| | | | |
|---|---|---|---|
| 2,933,902 | 4/1960 | Howard | 62—45 |
| 2,994,452 | 8/1961 | Morrison | 62—45 |
| 3,039,418 | 6/1962 | Versluis | 62—45 |
| 3,052,203 | 9/1962 | Henry | 62—45 |
| 3,110,156 | 11/1963 | Niemann | 62—45 |
| 3,272,373 | 9/1966 | Alleaume et al. | 62—45 |

FOREIGN PATENTS 888,247  1/1962  Great Britain.

LLOYD L. KING, *Primary Examiner.*